United States Patent [19] [11] 4,230,741
Yamazaki et al. [45] Oct. 28, 1980

[54] METHOD OF FORMING COATED LAYER OF FLUORESCENT SUBSTANCE ON INNER SURFACE OF BULB

[75] Inventors: Hitoshi Yamazaki; Hiroshi Ito, both of Kamakura, Japan

[73] Assignee: Mitsubishi Denki Kabushiki Kaisha, Tokyo, Japan

[21] Appl. No.: 970,044

[22] Filed: Dec. 15, 1978

[30] Foreign Application Priority Data

Dec. 21, 1977 [JP] Japan ................ 52/153808
Dec. 21, 1977 [JP] Japan ................ 52/153809

[51] Int. Cl.[3] ........ B05D 3/02; B05D 7/22; H01J 61/46; C09K 11/02

[52] U.S. Cl. ........ 427/67; 427/106; 427/157; 427/226

[58] Field of Search ........ 427/67, 106, 226, 157; 313/486, 487, 493

[56] References Cited

U.S. PATENT DOCUMENTS

| | | | |
|---|---|---|---|
| Re. 20,909 | 11/1938 | Claude | 427/67 |
| 2,706,691 | 4/1955 | Schaeter | 427/67 |
| 3,503,780 | 3/1970 | Kamiya | 427/67 |
| 3,514,276 | 5/1970 | Fugio | 427/67 |
| 3,832,199 | 8/1974 | Repsher | 427/67 |
| 3,833,392 | 9/1974 | Repsher | 427/67 |
| 3,847,643 | 11/1974 | Hammer | 427/67 |
| 3,963,639 | 6/1976 | Klein | 427/67 |
| 4,121,132 | 10/1978 | Repsher | 427/67 |
| 4,123,563 | 10/1978 | Mitade | 427/226 |

FOREIGN PATENT DOCUMENTS

| | | | |
|---|---|---|---|
| 528633 | 11/1976 | U.S.S.R. | 427/67 |

*Primary Examiner*—James R. Hoffman
*Attorney, Agent, or Firm*—W. D. Palmer

[57] ABSTRACT

Method for coating fluorescent material on the inner surface of a bulb using a coating lacquer comprising an aqueous suspension of the finely divided fluorescent material, an organic water soluble polymer, a surfactant, and colloidal alumina as a binder, the improvement which comprises incorporating boric acid and hydrogen peroxide in the suspension. When the coated lacquer is burned out by heating the bulb, the boric acid melt coats the alumina binder to render same inactive for gas absorption and the hydrogen peroxide accelerates the combustion or burning out of the organic polymer and surfactant from the coated lacquer.

9 Claims, No Drawings

METHOD OF FORMING COATED LAYER OF FLUORESCENT SUBSTANCE ON INNER SURFACE OF BULB

BACKGROUND OF THE INVENTION

The present invention relates to a method of forming a coated layer of a fluorescent substance on an inner surface of a bulb of a fluorescent lamp.

Heretofore, when a fluorescent substance layer is formed on an inner surface of a bulb of a fluorescent lamp or a mercury lamp, an aqueous lacquer is prepared by dissolving a water soluble organic polymer and a surfactant in water and suspending a fluorescent substance and a small amount of binder for improving bond strength of the fluorescent substance particles on the surface of glass bulb in the lacquer to form a suspension of a fluorescent substance, and coating the suspension on the inner surface of the bulb and drying it in a desired condition and then, burning out the organic polymer and the surfactant by heating the bulb to form the fluorescent substance layer.

In general, colloidal alumina of fine powdery aluminum oxide is used as the binder for the fluorescent substance. Thus the colloidal alumina has significant effect for increasing bond strength of the fluorescent substance; however, the colloidal alumina has a characteristic that it is converted to have high activity for a gas absorption after heating in the bulb heat-treating step.

Accordingly, in the fluorescent substance layer formed by the conventional method, the binder in the fluorescent substance layer absorbs or adsorbs large amounts of moisture and carbon dioxide gas in air on the surface of the binder. The absorbed gases are not easily evacuated in the following evacuating step of evacuating the bulb whereby the absorbed gases remain as impurity gases in the bulb and the lamp characteristics such as luminous flux maintenance factor of the lamp are impaired.

SUMMARY OF THE INVENTION

The present invention is to overcome the disadvantages and to provide a method of forming a fluorescent substance layer which does not cause the deterioration of the lamp by preventing the activation of the binder for gas absorption in the bulb heat-treating step.

In detail, the present invention is to provide a method of forming a stable fluorescent substance layer which has high bond strength on a glass surface and does not cause a deterioration of characteristics of the lamp which comprises a coating step of coating a suspension of a fluorescent substance on an inner surface of a bulb to form a fluorescent substance layer wherein said suspension is prepared by dissolving an organic water soluble polymer and an organic surfactant in water to prepare an aqueous solution of a lacquer and suspending a fluorescent substance and a fine powdery aluminum oxide as binder for the fluorescent substance in the aqueous solution of the lacquer and incorporating boric acid and hydrogen peroxide, and a bulb heat-treating step of burning out the organic polymer and surfactant remaining in the fluorescent substance layer and melt-coating boric acid on the surface of the fine powdery aluminum oxide to inactivate the surface by heating the bulb.

DESCRIPTION OF THE PREFERRED EMBODIMENTS

In general, when aluminum oxide is heat-treated, the surface of the aluminum oxide is activated for a gas absorption. This tendency is especially significant in the case of colloidal fine powder of aluminum oxide. In order to inactivate the surface of the aluminum oxide to overcome the tendency, it has been considered to previously absorb a stable substance on the surface of the aluminum oxide.

It has been found that boric acid is an excellent substance for inactivating the surface of the fine powdery aluminum oxide for gas absorption without inhibiting the effect of the aluminum oxide as the binder.

When boric acid is added to the suspension of the fluorescent substance in an aqueous solution of the lacquer, the boric acid is melted before completely burning out the organic materials of the lacquer components in the calcining step following the coated-layer-forming step whereby the contact of oxygen required for the complete combustion is prevented. As a result, carbon remains in the calcined fluorescent substance layer and the luminous efficiency of the fluorescent substance is decreased.

In order to overcome the disadvantages, it has been determined that when hydrogen peroxide or its precursor is incorporated into the suspension of the fluorescent substance and boric acid, the combustion of the organic materials of the lacquer components is significantly accelerated while maintaining the effect of boric acid for inactivating the fine powdery aluminum oxide in the bulb heating step, whereby the trouble of residual carbon in the calcined fluorescent substance layer caused by the addition of boric acid, can be prevented. In the case a precursor of the hydrogen peroxide, such as urea adduct ($CO(NH_2)_2.H_2O$), for example, is added to the lacquer suspension, the added amount is calculated on the basis of the hydrogen peroxide content thereof.

Other minor lacquer components which may be used are well known in the art such as 0.05% by weight of the lacquer of a defoaming agent such as sorbitan oleate.

The content of boric acid is usually in a range of 100% to 10% preferably 70% to 30% (wt.%) of the aluminum oxide.

The content of hydrogen peroxide expressed as a 30% solution is usually in a range of 100% to 10% (wt.%) of the total organic material in the suspension.

The present invention will be further illustrated by certain examples.

EXAMPLE 1

| | |
|---|---|
| Water | 150 cc |
| Hydroxyethyl cellulose (Cellosize QP-40 manufactured by UCC) | 3 g |
| Surfactant - Dispersing Agent (polyoxyethylene alkyl phenyl ether type) (NP-10 manufactured by Nikko Chemicals Co., Ltd. Tokyo, Japan | 0.3 g |
| Fine powdery aluminum oxide (0.02 micron) (Alon-C manufactured by Degussa) | 0.5 g |
| Boric Acid | 0.3 g |
| Hydrogen peroxide (30% aq. sol.) | 0.9 g |
| Calcium halophosphate fluorescent substance | 100 g |

These components were mixed to prepare a suspension of the fluorescent substance, and the suspension was coated on an inner surface of a glass tube a 40 W fluorescent lamp and it was dried and the coated layer was calcined by heating the glass tube at 600° C. in a furnace and then, the fluorescent lamp was prepared in accordance with the conventional method of the preparation of the fluorescent lamp.

The initial intensity of illumination and the luminous flux maintenance factor of the resulting lamp were compared with those of the lamp prepared by the same method except preparing the suspension of the fluorescent substance without incorporating boric acid and hydrogen peroxide.

The results are shown in Table 1.

TABLE 1

| | Initial Intensity of illumination | Luminous flux maintenance factor after 1000 hours lighting |
|---|---|---|
| Lamp (the present invention) | 3300 lumens | 92% |
| Lamp (Reference) | 3300 lumens | 89% |

As shown from the data of Table 1, the luminous flux maintenance factor after 1000 hours lighting of the lamp of the present invention is improved by 3% in comparison with the conventional lamp.

The bond strength of the fluorescent substance to the glass surface was not deteriorated by the incorporation of boric acid and hydrogen peroxide.

During the lacquer forming operation which involves stirring, hydrogen peroxide is gradually decomposed to form oxygen. To inhibit this decomposition, a small amount of phosphoric acid or uric acid preferably is added as a stabilizer for hydrogen peroxide, and the decomposition of hydrogen peroxide is significantly controlled. The content of the phosphoric acid acid or uric acid stabilizer is usually in a range of 0.5% to 0.05% preferably 0.4% to 0.1% (wt.%) taken with respect to a 30% hydrogen peroxide solution.

EXAMPLE 2

| | |
|---|---|
| Water | 150 cc |
| Hydroxyethyl cellulose (Cellosize QP-40 manufactured by UCC) | 3 g |
| Surfactant - Dispersing Agent (NP-10 manufactured by Nikko Chemicals Co., Ltd. | 0.3 g |
| Fine powdery aluminum oxide (0.02 micron) | 0.5 g |
| Boric Acid | 0.3 g |
| Hydrogen peroxide (30% aq. sol.) | 0.9 g |
| Phosphoric acid | 0.001 g |
| Calcium halophosphate fluorescent substance | 100 g |

These components were mixed to prepare a suspension of the fluorescent substance and suspension was coated on an inner surface of a glass tube for a 40 W fluorescent lamp and it was dried and the coated layer was calcined by heating the glass tube at 600° C. in a furnace and then, the fluorescent lamp was completed in accordance with conventional practices.

The initial intensity of illumination and the luminous flux maintenance factor of the resulting lamp were compared with those of the lamp prepared by the same method except for the preparation of the suspension of the fluorescent substance without incorporating boric acid and hydrogen peroxide.

The results are shown in Table 2.

TABLE 2

| | Initial Intensity of illumination | Luminous flux maintenance factor after 1000 hours lighting |
|---|---|---|
| Lamp (the present invention) | 3300 lumens | 92% |
| Lamp (Reference) | 3300 lumens | 89% |

In accordance with the present invention, the fine powdery aluminum oxide is incorporated as the binder for the fluorescent substance and boric acid and hydrogen peroxide are added to the suspension of the fine powdery aluminum oxide and the fluorescent substance, and the suspension is coated on an inner surface of the bulb and dried. The coated fluorescent substance layer is then calcined to melt-coat boric acid on the surface of the fine powdery aluminum oxide, whereby the gas absorption of the resulting fluorescent substance layer after the calcination can be controlled and the characteristics of the lamp such as the luminous flux maintenance factor of the lamp are improved.

What is claimed is:

1. In a method of forming a coated layer of a fluorescent substance on the inner surface of a bulb which comprises coating a suspension incorporating a fluorescent substance, an organic water soluble polymer, a surfactant, a fine powdery aluminum oxide as binder, and a bulb heat-treating step of burning out said organic water soluble polymer and said surfactant from the coated layer, the improvement which comprises incorporating boric acid and hydrogen peroxide or a precursor thereof in said suspension.

2. A method according to claim 1 wherein phosphoric acid and/or uric acid is also incorporated in said suspension.

3. A method according to claim 2 wherein said phosphoric acid and/or uric acid is incorporated at a ratio sufficient to prevent decomposition of hydrogen peroxide.

4. A method according to claim 1 wherein said boric acid is incorporated at a ratio sufficient to inactivate the surface of said fine powdery aluminum oxide for gas absorption.

5. A method according to claim 1 wherein said hydrogen peroxide or precursor thereof is incorporated at a ratio sufficient to completely burn out said organic water soluble polymer and said surfactant.

6. A method according to claim 1 wherein said boric acid is present in amount of from 100 wt.% to 10 wt.% of said aluminum oxide, and said hydrogen peroxide, expressed in terms of a 30% solution, is present in amount of from 100 wt.% to 10 wt.% of said organic polymer plus said surfactant.

7. A method according to claim 6 wherein said boric acid is present in amount of from 70 wt.% to 30 wt.% of said aluminum oxide, and said hydrogen peroxide, expressed in terms of a 30% solution, is present in amount of from 70 wt.% to 30 wt.% of said organic polymer plus said surfactant.

8. A method according to claim 7 wherein at least one of phosphoric acid and uric acid is also incorporated in said suspension in total amount of from 0.4 wt.% to 0.1 wt.% taken with respect to said 30% hydrogen peroxide solution.

9. A method according to claim 6, wherein at least one of phosphoric acid and uric acid is also incorporated in said suspension in total amount of from 0.5 wt.% to 0.05 wt.% taken with respect to said 30% hydrogen peroxide solution.

* * * * *